United States Patent [19]

Zola

[11] 3,811,904

[45] May 21, 1974

[54] NOVEL COATING COMPOSITIONS AND THEIR PREPARATION

[76] Inventor: John C. Zola, 2662 S. Tenth Ave., Arcadia, Calif. 91006

[22] Filed: July 10, 1972

[21] Appl. No.: 270,021

Related U.S. Application Data

[63] Continuation of Ser. No. 77,693, Oct. 2, 1970, abandoned, which is a continuation of Ser. No. 615,044, Feb. 8, 1967, abandoned, which is a continuation-in-part of Ser. No. 201,274, June 11, 1962, abandoned.

[52] U.S. Cl............. 106/193 J, 106/228, 106/253, 252/308, 252/316, 260/13, 260/16, 260/17 R, 260/34.2, 260/37 EP, 260/37 N, 260/40 R, 260/41 R, 260/41 B, 260/823
[51] Int. Cl.... C08b 21/12, C08f 45/04, C08f 45/28
[58] Field of Search.......... 260/37 EP, 37 N, 37 NP, 260/34.2, 13, 16, 17 R, 823, 33.6 A, 33.6 R, 32.8 R; 252/308, 316; 106/253, 193 J, 228

[56] References Cited
UNITED STATES PATENTS 2,636,872  4/1953  James et al. ............... 260/33.6 UA
2,964,417  12/1960  Ward ................................. 260/34.2

OTHER PUBLICATIONS

Payne–Organic Coating Technology (Wiley)(N.Y.) (vol. 1, 1954; vol. 2, 1961), pages 515–518 & 1246.

*Primary Examiner*—Morris Liebman
*Assistant Examiner*—H. H. Fletcher

[57] ABSTRACT

Disclosed are non-aqueous, substantially all organic multi-color coating compositions of two or more phases consisting of at least one dispersed phase consisting of discrete globules or droplets of film-former and organic solvent, which dispersed phase is dispersed in a liquid organic dispersing medium. At least some of the dispersed globules are different in color from the dispersing medium, and a substantial number of said globules are at least 25 microns in size. The dispersions employ in the discrete globules a polymeric film former of sufficiently high molecular weight, preferably cross-linked, to render a colloidally dissolved solution in an organic solvent immiscible with the same organic solvent not containing the polymeric film former. The dispersing medium may or may not contain a second film-former.

25 Claims, No Drawings

NOVEL COATING COMPOSITIONS AND THEIR PREPARATION

This application is a continuation of copending application, Ser. No. 77,693, filed Oct. 2, 1970, now abandoned, which is a continuation of application Ser. No. 615,044, filed Feb. 8, 1967, now abandoned, which is a continuation-in-part of application Ser. No. 201,274 filed June 11, 1962, also now abandoned.

This invention relates to non-aqueous coating compositions and methods for preparing such compositions. More particularly, the invention relates to non-aqueous coating compositions in which discrete globules of a solution of non-aqueous coating material such as paints, lacquers or enamels are dispersed in a liquid, non-aqueous medium, the discrete dispersed globules and the dispersing liquid being relatively immiscible with one another.

Dispersions of non-aqueous coating materials in non-aqueous media have been employed heretofore, and have been useful in providing thick coatings in a single application. Plastisols and organosols are common examples. (See G. M. Powell et al, "Organosols from Vinyl Resins," *Official Digest of Federation of Paint and Varnish Production Clubs*, (February, 1954) pp. 94–108). This type of dispersion has also provided a limited range of textures, but has been subject to various limitations. In particular, the preparation of a coating employing two different separate colors has required either separate operations, or special equipment to dispense simultaneously the materials of different color. The formation of sound, coherent coatings has required dispersions in which the particles are very small, on the order of 10 microns or less. For satisfactory fusion of even small particles, elevated temperatures have commonly been necessary.

In plastisol and organosol coating compositions of the type described, it is common practice to place any coloring materials in the outer dispersing medium only, so that on intermixing two or more such dispersions, a blend of pigments would be obtained rather than a multi-color effect. Moreover, even if the resinous particles were pigmented, multi-colored coatings would still be unobtainable by this means, since the small particle size required for good film formation would prevent the visual distinction of one particle from another as is necessary to obtain a multi-color effect.

Various specialty coatings which may be textured, and some of which may be heterogeneous in color or shade, have been provided by techniques which are not dependent upon the use of dispersions of coating materials. (See Harry Burrell, "A Survey of Novelty Finishes," *Organic Finishing*, Vol. 16, No. 12 (December, 1955) pp. 15–20). Some of these, such as pebble or veiling finishes, are based upon high viscosity coating compositions which, when applied to a surface to be painted, are made to impinge upon that surface in the form of blobs or strings which tend to fuse with one another, but do not completely level out before the coating film has hardened. Spatter finishes are somewhat similar in character, but employ low viscosity coating compositions which are applied in such a manner as not to cover the ground coat completely. Metallic coatings such as the opalescent types or hammer finishes are dependent upon the use of very fine aluminum flakes which reflect light somewhat differently in different areas of the coating.

All of these specialty finishes are either limited in the variation of color and texture they can provide, or require several successive coating operations to bring about the end result. In principle, their method of operation is quite dissimilar to that in which dispersions of coating materials are used to provide multi-colored or textured coatings in a single operation.

Multi-color coating compositions have been prepared by providing dispersions of relatively large particles of a coating vehicle in a liquid dispersing medium. Such dispersions have generally required the employment of an immiscible pair of solvents in the dispersed and dispersing media.

One means of providing the required immiscibility of solvents has been disclosed in my prior U.S. Pat. No. 2,591,904, which employs water in the dispersing medium, and uses in the dispersed phase various non-aqueous solvents which are immiscible with water. Another means of attaining dispersions through immiscible solvents is that disclosed in Roney U.S. Pat. No. 2,990,386, which employs non-aqueous solvents in both dispersed and dispersing media. In accordance with this patent it is possible to avoid aqueous materials, and to obtain satisfactory covering ability on surfaces not readily wetted by water. Coating formulations in accordance with this patent are obviously limited, however, to the use of coating materials which have satisfactory selective solubility in one member of a group of immiscible solvent pairs. Since in the non-aqueous field such immiscible pairs are relatively rare, at least one of them is likely to be undesirable from the standpoint of cost, volatility, toxicity, or other property. It is also found that dispersions based on immiscible non-aqueous solvents frequently have only marginal stability.

Multi-color coating compositions have also been provided by dispersions wherein the solvents employed in different phases are miscible with one another. In Ward U.S. Pat. No. 2,964,417, insolubilization of the dispersed particles in the dispersing medium is attained by using in the dispersing medium a solvent mixture which precipitates or throws out of solution the solid of the coating material employed in the dispersed phase. In this precipitation of the coating material when the dispersed phase is mixed with the dispersing medium, the precipitated coating material takes the form of fibrous or flake-like particles which have little tendency to coalesce with one another, either in the liquid coating composition or in the film deposited therefrom. The precipitated dispersed particles are instead bound together in the finished film by coating materials deposited from the dispersing medium.

The procedure of said U.S. Pat. No. 2,964,417 for attaining dispersions useful as coating compositions is inferior to that of said U.S. Pat. No. 2,990,386 which employs immiscible solvents or vehicles, in that it contains precipitated particles which do not readily knit with one another, or fuse smoothly with the coating materials of the dispersing medium. In the finished film, the portions deriving from precipitated particles tend to be porous in nature and irregular fibrous to flake-like in shape, often protruding roughly from the surface of the coating film. The general appearance is similar to that which could be attained more economically by dispersing solid fibrous solid fibrous material in a single phase coating vehicle.

To insure good film formation it is essential that all phases of a coating composition should be capable of satisfactory fusion, upon volatilization of the solvent components, with components deposited adjacent to them. In general, this requires that the coating materials in all phases of the coating composition shall remain satisfactorily solvated by the solvents present in that phase. Heretofore this has not been achieved with miscible non-aqueous solvents, but can be attained, as shown hereafter, in accordance with the present invention.

It is an object of the present invention to overcome the limitations in coating materials of the prior art by utilizing a new and distinct concept in producing coating compositions.

It is another object of the present invention to employ non-aqueous media for the production of multicolored coating compositions which by simple air-drying at ambient temperatures are capable of forming sound, coherent coatings, either smooth or textured, and of variable thickness and covering ability.

It is a further object of the present invention to provide coating compositions such as paints, lacquers and enamels comprising non-aqueous dispersions in which the dispersed phase is immiscible with the dispersing medium, the solvents of each phase being normally miscible with one another, and the film-forming materials in each phase being essentially in solution, and not precipitated or flocculated by the presence of the other phase.

It is another object of the present invention to provide multi-colored coating compositions comprising non-aqueous dispersions by use in the dispersed phase of cross-linked polymers which are characterized by limited swelling in organic coating solvents which dissolve non-crosslinked polymers of this chemical type.

It is a further object of the present invention to provide coating compositions comprising non-aqueous dispersions by means of film-forming polymers which are sufficiently incompatible with one another to form a plurality of immiscible solutions in organic coating solvents at normal concentrations, which on application form films of clearly visible multi-color patterns.

The foregoing and other objects and advantages of the present invention will be explained and will be apparent to those skilled in the art from the present description.

The new and unexpected results and effects of this invention result from coating compositions employing two or more non-aqueous media which are immiscible with one another, but the solvents of which media are miscible with each other. The compositions consist essentially of globules or droplets of a fluid to gelatinous coating solution, such as paints, lacquers or enamels, dispersed in a second organic non-aqueous liquid in which the globules do not dissolve.

In one aspect of the invention, the lack of solution of the dispersed globules or droplets in the surrounding dispersing medium is dependent primarily on the unusual character of the film-former of the dispersed phase. In another aspect, the lack of solution of one phase in the other is dependent primarily on the relationship of the respective film-formers of each phase to another. In either case, the compositions are unique in that the coating components of both phases remain substantially in solution even after the dispersion has been formed. Because of this unusual phenomenon, the coating components of either phase are capable, during film formation, of coalescing smoothly with adjacent coating materials deposited from either phase.

The two principal aspects of the invention are characterized most obviously by indicating whether the dispersed globules may or may not coalesce freely with one another. It is therefore convenient to denote them as stable or transient dispersions, and in part to discuss them separately in the following description.

THE STABLE DISPERSIONS

The typical stable dispersions of the invention are characterized in that some of the discrete globules are colored differently from others. For this reason the dispersed globules must remain substantially separate without appreciable coalescence with one another. This is facilitated by using discrete globules of heavy-bodied fluid to gelatinous consistency. It is essential, however, that the process for preparing the dispersions prevents solution of the discrete globules in the surrounding dispersing medium but does not impair the function of the globules as film-forming materials. After dispersion and after aging substantial lengths of time, the dispersed globules retain adequate flow and, upon application to a surface, display ability to coalesce with one another, even in the absence of film-forming materials in the continuous or dispersing phase.

One means of providing the required phase separation without the use of immiscible solvents is by simple flocculation or precipitation of the film-former. Since this phenomenon is within the experience of every coating technologist, it becomes readily to mind. It is also exemplified in the prior multi-color art, and at first sight seems to suggest a feasible solution.

Phase separation by precipitation is based upon the fact that while precipitation of inorganic materials (as from aqueous solution) commonly produces crystalline matter, the organic colloids used as coating materials often separate from the solution as gels which retain some portion of the solvent used to dissolve them. This is particularly true if the colloids are linear, as contrasted with spherocolloids.

The cellulosic polymers are noted for the linear, asymmetric character of their molecules. In formulating multi-color coatings by the precipitation process it is not unexpected, therefore, that these materials have been preferred in the prior art in order to maintain some degree of solvation of the precipitated material. It has been found, however, that in order to prevent partial solution of the precipitated flakes or fibers, with consequent loss of coloring matter to the dispersing medium, substantially dense and hard precipitates are commonly required. As should be expected, dispersions of such precipitates are poor film-forming compositions, since the particles have poor flow properties, and at best tend to form only a rough, tangled network rather than a smooth continuous film.

In attempts to improve the film-forming properties of such dispersions, prior art workers have included coating materials in the dispersing medium. This is beneficial in that it helps to bind together the angular, fibrous precipitates and produce a continuous film when applied to a surface by filling in the empty spaces between them. Moreover, it is often found that if the concentration of film-former in the dispersing medium is relatively high, it modifies considerably the initial character of the dispersed precipitates. It appears, however, that this effect is largely temporary. Upon aging, the dispersed particles develop the characteristics commonly associated with precipitated materials, which make them unsatisfactory as coating compositions.

The reason for this is that regardless of the presence or absence of film-formers in the dispersing medium, phase separation in the prior art compositions is dependent essentially on a difference in solvent strength between the precipitated and dispersing phases. That is, it requires the presence in the dispersing medium of a non-solvent for the precipitated film-former of the dispersed phase, and as suggested in U.S. Pat. No. 2,964,417, probably involves the migration of solvent from one phase to another.

It is readily visualized that if the dispersing medium contains a polymeric film-former, the effect of the dispersing medium on the dispersed precipitated material is that of both polymer and solvent, and not of the solvent alone. Apparently the polymer has delayed the migration of solvents, preventing initially the solution of dispersed coating material without excessively hardening it. Since upon aging, however, the dispersed particles develop the hard, dense properties characteristic of precipitated material, the precipitation process has proven wholly undesirable as a means of attaining phase separation.

In the dispersions of the present invention, phase separation is brought about by use of film-forming polymers of exceptionally high molecular weight, and especially of at least partially cross-linked polymers, in the dispersed phase. These unusual film-forming or coating materials are characterized by their ability to absorb only limited amounts of an appropriate relatively weak solvent which is capable of substantially dissolving them either at normal or elevated temperatures. If the polymer is at least partially cross-linked, the appropriate solvent is one which would dissolve it in the absence of cross-linking. Globules of the solvated polymer are therefore immiscible with excess portions of the solvent. The resulting globules of high molecular weight polymer and organic solvent are generally, but not necessarily, gelatinous. Because of their unique state of solvation, they have substantially the character of colloidal solutions, and form sound films in the absence of auxiliary film-formers in the dispersing medium.

The principal features of the present dispersions can be illustrated by a simple example. A heavy bodied and partially oxidized linseed oil (Spencer-Kellogg Diamond K) was dissolved in a mixture of mineral spirits and odorless mineral spirits (ratio of 55:45) in which it was substantially soluble. The solution was warmed to about 180° F. and stirred during the addition of tetrabutyl titanate (about 10% by weight of film-former solids), which rapidly cross-linked the partially oxidized oil, yielding a clear, gelatinous solution. This gelatinous solution was colored by addition (preferably before cross-linking) of a small portion of a dispersion of pigments in the original linseed oil. When this colored material was added to another portion of the original solvent mixture, it retained substantially the same degree of solvation, but did not dissolve in the surrounding or dispersing medium made up of the additional portion of original solvent. Upon stirring, this coating material was broken into gelatinous globules which retained the coloring matter within them without substantial loss to the dispersing medium. Coalescence of the globules with one another was prevented by addition of 1% of a colloidal organic modified magnesium montmorillonite clay. When two differently colored dispersions were mixed, a multi-color coating composition was formed, which by simply spraying onto a surface produced a smooth, well-knit multi-color coating.

The ability to swell without complete dissolution is characteristic of cross-linked polymers, but these materials have generally been avoided heretofore as undesirable for coating compositions. In particular, globules of visible size, such as 25–50 microns or over, would produce undesirable heterogeneity in ordinary coating compositions. For multi-color coating purposes at least a substantial number of particles of this size are required, and for msot patterns the preferred size is on the order of 100–1,000 microns or larger. Unexpectedly, I have found that when dispersed in another non-aqueous organic liquid medium, globules of solvated cross-linked polymers can be used satisfactorily as coating materials, and can also maintain isolated in discrete globules the different coloring materials required for multi-color coatings.

The satisfactory use of large dispersed globules as a coating material is dependent largely on ability to provide a desirable consistency of the discrete globules. It is typical of cross-linked polymers that they can provide a wide variety of consistencies without complete dissolution in the surrounding medium. A classical example is the copolymer of styrene and divinyl benzene studied by Staudinger, and outlined in Jirgensons, *Organic Colloids*, Elsevier Publishing Co., 1958, p. 216. In benzene, a polymer containing 10 molecules of divinyl benzene per 100,000 molecules of styrene, swelled to 12 times its original volume. A polymer containing 2 molecules of divinyl benzene per 100,000 of styrene swelled to 181 times, while polystyrene itself displayed unlimited swelling, or complete dissolution.

Present example VIII below makes use of a similar polymer which can be swollen to concentrations of less than 5% solids, thus forming large, gelatinous globules which do not coalesce with one another even after aging for several years. Despite their gelatinous character, the globules can be made sufficiently fluid so that on spraying through an ordinary lacquer gun they yield a smooth and nearly textureless film. The degree of swelling is determined by the aromatic content of the solvent. The polymer can thus be solvated to substantially any desired degree, from relatively firm but spongy particles to the semi-fluid gelatinous globules described.

One of the properties of cross-linked polymers which makes them suitable for the present invention is the characteristic of selective absorption of solvents from a solvent mixture. This is discussed by Hwa, Meitzner and McBurney ("Separation of Miscible Liquids by Polymeric Absorbents," Industrial and Engineering Chemistry, 49 (1957) p. 1828), who used copolymers of acrylic ester-divinyl benzene for separation of mixtures of aliphatic and aromatic hydrocarbon solvents. In the presence of such a solvent mixture, it is characteristic of cross-linked polymers to absorb preferentially the true solvents for the polymer involved. This is probably a significant factor in the ability of swollen globules of such materials to remain substantially in solution in the presence of a relatively weak solvent mixture.

With a few linear polymers of very high molecular weight, such as 100,000 or more, it is possible to use them as film formers and attain the required phase separation without any considerable degree of cross-linking. In this case the solvent composition is more significant, however, with satisfactory behavior generally being dependent upon use of specific solvents with specific polymers. This is illustrated by present Example X below, wherein an epoxy resin forms an entirely liquid solution which is capable of absorbing only a limited quantity of the methyl ethyl ketone solvent. In order to attain more satisfactory stability, avoiding coalescence of dispersed globules, it was still desirable to introduce cross-linking, which was done by means of tetrabutyl titanate.

The degree of cross-linking required for any given coating material is dependent on the polymer, and particularly on its molecular weight. For example, only a few hundredths to a few percent of a cross-linking agent may be needed. The higher the molecular weight, the less cross-linking is necessary to attain the required limited absorption of solvent. To a degree, also, a given proportion of cross-linking agent will be more effective at higher concentrations of polymer than at lower concentrations.

In any particular case it is readily determined whether the cross-linking is adequate. This involves preparing a solution of the polymer in a relatively lean solvent mixture which is near its precipitation point, but has sufficient solvent strength to yield a substantially clear, gelatinous solution. If the cross-linking is sufficient, the gel will not dissolve when dispersed in an excess portion of the same solvent. Complete solution or an undesirable degree of swelling indicates the need for more cross-linking of the polymer selected as film-former.

If the cross-linking is more than necessary for this minimum solvent strength, further swelling can be induced by using a richer solvent mixture. As in conventional coatings, the globule consistency is dependent largely on the solvent strength and polymer concentration.

Although cross-linking must be adequate to permit use of a solvent which does not precipitate the polymer, the preferred degree of cross-linking is generally no more than necessary to permit dissolution of the globules in a relatively weak solvent. This provides the greatest economy of solvent usage by permitting higher polymer concentrations.

The stable dispersions of this invention provide a unique and easily controllable means of producing textured films. Unless texture is sought, however, the preferred consistency of globules is that of a slightly gelatinous material which retains substantially the flow properties of conventional coating compositions. The capability of providing dispersed globules or droplets of such a fluid character is one of the factors which clearly distinguishes the present compositions over the prior art.

By at least partial precipitation of the film former or coating material, the prior art compositions produced dispersed discrete fibrous or flaky particles which might also be referred to as gels. The unique properties of the present dispersions are believed to result from a fundamental difference between the gel structures involved.

Since the majority of gels encountered in common experience are produced by some degree of flocculation, it is sometimes explained that gel formation from a colloidal solution involves a partial aggregation of particles which is less complete than in flocculation. This is readily maintained, for example, in the case of nitrocellulose. In running the ASTM dilution ratio test for nitrocellulose (ASTM No. D 1720-60 T), gelation occurs at approximately the same point as obvious turbidity from precipitation.

It is recognized, however, (see Jirgensons, *Organic Colloids*, Elsevier Publishing Co., 1958, p. 254) that in addition to gels arising from such secondary valencies, there are also gels arising from primary bonds; that is, the gels of cross-linked polymers. Where the framework required for gelation is provided by the basic molecular structure rather than by loose aggregations of molecules, it is clear that the polymeric material is substantially in solution, regardless of the high viscosity or gelatinous consistency of this solution. With a moderate amount of cross-linking, it is recognized that macromolecular polymers are converted into structures which consist substantially of one vast, interlocking molecule or matrix.

The practical effect of this distinction over the prior art is demonstrated by the entirely different character of the films produced by the present compositions. Because the film-forming polymer in the globules is in solution, rather than precipitated, the dispersed globules are clear rather than turbid. Upon deposition they readily form sound films in the absence of film-formers in the continuous medium, and can even provide smooth and almost textureless coatings.

As a rule, the required film-forming polymers, characterized by limited swelling of their solutions, are not available among materials normally intended for solution coatings. Some of the polymers manufactured for use in plastics or plastisols can be used. Present example VII below, employs a styrene-butadiene copolymer manufactured for use in rubber compounding. Present example IX below, makes use of a vinyl chloride resin for plastisols which is soluble at slightly elevated temperatures, and after dissolving remains solvated at normal ambient temperatures. Such materials, however, are generally less satisfactory than polymers prepared especially for the present type of compositions.

Many conventional coating materials can be satisfactorily modified for use in the present dispersions. In example VII below, a conventional alkyd is cross-linked by reaction with tetrabutyl titanate. Many other reactions capable of producing slightly gelatinous coating materials are satisfactory and well known to the art. For example, some well known titanium esters, such as tetrabutyl titanate and tetraisopropyl titanate, react with many polymers containing hydroxyl groups such as alkyds, epoxy resins, cellulosic derivatives, vinyl alcohol copolymers. Polymers containing carboxyl groups, such as alkyds, copolymers of vinyl resins with polybasic acids, are subject to gelation by reaction with multivalent metal organics such as calcium naphthenate, aluminum chelate, or multivalent metal oxides such as those of lead, calcium, or magnesium. Unsaturated compounds such as oils or alkyds can be oxidized or polymerized, as by air blowing or reaction with peroxides, heat bodying, radiation, etc.

It is apparent that many polymers prepared by three-dimensional condensation reactions can readily be adapted for use in the present compositions, merely by modifying the functionality of their components. In such resins as alkyds, polyesters, polyurethanes, etc., the course of reaction is carefully controlled to fall short of gelation, but can easily be modified to yield any desired consistency of polymer solutions, from gelatinous fluids to firm gels. Similarly cross-linking elements are readily introduced into the linear high polymers, as illustrated by styrene-divinyl benzene, styrene-butadiene, copolymers of vinyl monomers with maleic anhydride or ethylene glycol dimethacrylate, copolymers of acrylic esters with acrylic acid, etc. The introduction of acidic elements permits the degree of cross-linking to be controlled after polymer synthesis, by varying the proportion of basic reactants. It is to be expected that polymers prepared especially for use in the compositions of this invention would have desirable characteristics of toughness, resilience, and the like which cannot be built into resins intended for ordinary solution coatings.

As in conventional coatings technology, a variety of solvents can be used with the polymeric materials, but selection is made according to the usual considerations of volatility, cost, etc. In addition, it is necessary to use a solvent strength which is suitable for swelling the film-former to the desired consistency without complete dissolution of the globules. If the straight-chain molecular weight and/or cross-linking is sufficient to develop an adequate structural framework, this solvent strength is not critical, and will be determined primarily by the desired globule consistency. If less cross-linking or lower molecular weights are employed, it may be necessary to use a leaner solvent somewhat nearer the point of flocculation. From the opposite point of view, care in formulating the solvent strength will necessitate less cross-linking, thus permitting the use of a wider range of polymers and higher solids concentration. It has been found that immiscible globules which are substantially colloidal solutions rather than precipitates can be obtained with solvent requirements not much greater than those of conventional coatings.

In preparing the dispersions, it is preferred that the solvent strength of the dispersed and dispersing phases should be not too different from one another before mixing the two compositions. They need not be identical, however, since pigment dispersion in the gelatinous film-former may be facilitated by reducing its viscosity. A leaner solvent can then be used in the dispersing medium, which will yield the desired balance after solvent interchange between the phases. Conversely, it may be preferable in some cases to use a weaker solvent in the dispersed phase in order to minimize breaking up of the particles during dispersion. By slightly enriching the solvent in the dispersing medium, the dispersed material can then be swollen further after it has been broken into globules.

As in conventional coatings, it is preferred to formulate the coating material of the dispersed phase at a solvent strength not much greater than the minimum required for good solvation, using a polymer concentration which yields the desired consistency. If cross-linking is sufficient, little change in solvation or consistency will occur on dispersing this film-former in a medium of similar solvent strength. If dissolution of the globules tends to occur (as indicated by loss of coloring matter to the dispersing medium), the solvent strength of the continuous phase can be reduced to the point where flocculation commences. If in this way appreciable solution cannot be prevented without substantial flocculation, then further cross-linking is indicated.

In many cases the dispersing medium of stable dispersions may consist only of an organic solvent. It can also optionally contain an organic film-former, which may or may not be compatible with the coating material of the dispersed globules or phase. It can even contain a polymer of the same type as that of the dispersed phase, but sufficiently low in molecular weight to yield a solution of desirable viscosity. It is often preferable that it be different in type from the polymer of the dispersed phase, as low molecular weight polymers of the same type tend to increase the solubilizing action of the organic solvent. As discussed hereinafter, the use of polymers having some degree of incompatibility with the dispersed polymer is effective in reducing the solubility of the dispersed globules. In contrast to the prior art, it is clear that neither the presence or absence of a film-former, nor the type of film-former used, in the dispersing medium is a critical factor.

Also in contrast to the prior art, the stable dispersions of the present invention often require a stabilizing agent in the dispersing medium in order to prevent coalescence of the dispersed globules with one another. This tendency of the dispersed particles to coalesce clearly reflects the essential difference in character between a precipitated film-former or coating material, and gels wherein the film-former is substantially in solution.

The stabilizing agents found more generally useful for the present compositions include the inorganic lyophilic colloids such as colloidal silica and organic derivatives of colloidal magnesium aluminum silicates; and organic thixotropic agents which consist of colloidal dispersions of insoluble organic gel particles, for example, the Thixcin products of Baker Castor Oil Co., which are understood to be hydrogenated castor oil derivatives. Stabilizing agents are generally effective in proportions of a few per cent, and are preferably employed at concentrations of no more than about 5%, in order to minimize flatting effects on the deposited coating film.

THE TRANSIENT DISPERSIONS

The transient dispersions of the present invention result from the adaptation to multi-color coating purposes of a well known phenomenon which has generally been avoided as altogether undesirable from the standpoint of coatings technology. This is the phenomenon of incompatibility of polymers, and especially of immiscible liquid solutions. I have found, however, that the unique properties afforded by heterogeneous coating compositions make this phenomenon eminently useful within certain readily obtainable limits.

The phenomenon of incompatibility is one which pertains particularly to the field of high polymers. As pointed out by Dobry and Boyer-Kawenoki ("Phase Separation in Polymer Solution," *Journal of Polymer Science*, 2 (1947) p. 90), solutions of small molecules are always miscible unless they are near the saturation point. With the macromolecules of high polymers, however, immiscibility of solutions commonly occurs far short of the saturation point.

The term "incompatible", as commonly understood in the coatings field, refers to the development of hazy or opaque films upon evaporation of solvent from a polymer solution. This results from the fact that although the solution is initially homogeneous, phase separation occurs at some point before volatilization is complete. During the drying process, that is, the concentration of some components has become sufficiently great to develop immiscible solutions.

According to Dobry, et al., imcompatibility is the rule rather than the exception. Of the 35 pairs of high polymers tested in a common organic solvent, only four did not show phase separation at moderate concentrations. Incompatibility in one solvent nearly always implied incompatibility in another. In the one exception encountered, the authors felt that the apparent compatibility may have reflected only the lack of droplet coalescence resulting from very high viscosity.

In somewhat similar work relating to paint vehicles ("The Search for an Incompatibility Test," *Official Digest of Federation of Paint and Varnish Production Clubs* (1956) p. 985) it was shown that films showing microscopic phase separation were quite common and not necessarily undesirable.

It is therefore apparent that incompatibility is a common phenomenon pertaining to the relationship of two polymers to one another. It has generally been avoided because unless the particles separating are extremely small, the resulting film is likely to be somewhat hazy, opaque, or low in gloss. In many cases, the film may also show reduced physical integrity.

Upon investigating this phenomenon for multi-color coating purposes, it was therefore surprising to find that incompatible polymers can be used to produce wholly satisfactory films, provided the areas of heterogeneity are macroscopic rather than microscopic. Since the situation is a complex one, not all the reasons for this are wholly apparent. It seems likely, however, that the usefulness of the present compositions is related to the fact that substantial separation of polymers is provided before film deposition, rather than developing progressively during solvent evaporation.

It is probable that after intermixing the two solutions, each phase contains some of the polymer introduced by the other. It appears likely, however, that the proportions assumed at equilibrium will be those most conducive to compatibility in each separate phase. The requirement for film integrity is then only good cohesion between the individual sections. Whatever the explanation may be, I have found that satisfactory film formation is readily obtainable. As explained in the following, the only requirement is that the polymers or polymer mixtures chosen for the separate phases should not be excessively incompatible with one another.

In any system of imcompatible polymers in a common solvent, phase separation occurs only at some minimum concentrations of the polymers. As pointed out by Boyer, et al., supra, the concentrations required are dependent on a number of factors, including molecular weight and possibly the shape of the molecules. Polymers of high molecular weight separate at lower concentrations than polymers of lower molecular weight. At minimum concentrations, incompatible polymers will not necessarily separate at all ratios of the polymers, but at higher concentrations such as used in the present compositions, are commonly incompatible over a wide range of ratios. Polymer ratios and other factors, such as temperature, are therefore of minor significance as compared with polymer concentrations.

For the present purpose it is convenient to speak of the degree of incompatibility ("DI") of two polymers or mixtures of polymers. The import of this is that, other things being equal, two polymers with a high DI will separate at lower minimum concentrations than those with a lower DI. For the compositions of the present invention, only a certain range of DI is desirable. The DI must be that which will bring about phase separation within a preferred range of minimum concentrations.

For example, Dobry, et al., supra, have listed an example of extremely high degree of incompatibility. This is the pair, polystyrene and nitrocellulose, which in methyl ethyl ketone produced phase separation at minimum concentrations of 0.15% polystyrene and 0.6% nitrocellulose. Similarly, I have found that nitrocellulose and a copolymer of styrene-butadiene have a high DI.

For the compositions of the present invention, as in conventional usage, it is preferable to have film-forming vehicles which contain at least 10–20% solids. A DI which yields phase separation at much lower concentrations is therefore unnecessary. Moreover, I have found that a very high DI yields films of poor integrity, regardless of the size of the heterogeneous areas. The DI should be no more than that which yields phase separation at a minimum concentration of both film-formers of at least a few percent, and preferably more than 5%.

On the other hand, the DI must be sufficiently high to bring about phase separation at concentrations which provide desirable viscosities. The desirable viscosities of phases are contingent on several factors which can be described as follows.

The preferred viscosities are relatively low, and no greater than those of ready-to-apply coating compositions. If either of the phases (but especially the continuous phase) has too high a viscosity, the dispersed phase will tend to emulsify rather than coolesce into droplets of visible size.

For production of multi-color coatings, at least a substantial number of the dispersed globules or droplets must be relatively large, such as 25 or 50 microns or larger. For the majority of patterns, at least some of the droplets should be on the order of 100–1,000 microns. It is characteristic of the present compositions that the average droplet size is not static, but dependent on the mechanical treatment. When the dispersions are stirred or otherwise agitated, many droplets are broken into smaller ones, and there is also intermixing between droplets of the same phase. When agitation ceases, many droplets coalesce with one another, especially if the viscosities of both phases are low. This occurs in the coating dispersion in the container, and also in the applied film. For production of the preferred patterns, the viscosities of the different phases must therefore be sufficiently low to permit adequate coalescence of droplets to a visible size before volatilization causes the film to set up.

For a given viscosity, the rate of coalescence of droplets increases with an increasing DI. The DI must therefore be great enough to provide the required separation of phases or coalescence of droplets at an adequate rate, with appropriate viscosities. For this purpose the minimum concentration required for phase separation should be no greater than about 50% by weight for either phase. Using polymers of average molecular weight commonly employed in coating vehicles, the preferred minimum concentration is no greater than about 35%.

In practice the behavior indicating the required DI, or its absence, is readily observed and interpreted by those skilled in the art of coatings technology. Excessive incompatibility is indicated by lack of sound cohesion between the different sections of the heterogeneous film. If the two phases have been colored, inadequate dispersed globule or droplet size is of course evident from the lack of visible color distinction in the liquid coating composition, as well as in the applied film. Often it is more convenient to judge the rate of phase separation by observing a mixture of the two clear coating vehicles under a low power microscope. Adequate phase separation is indicated by the rapid appearance of a substantial number of droplets of at least 25–50 microns immediately after stirring the mixture and allowing it to set.

In part, as in conventional coatings technology, the polymers chosen for each phase are selected for the physical characteristics provided by their films. In view of the present state of the art concerning incompatibility, the selection of resins for a satisfactory DI is no more difficult than this.

As noted by Dobry, et al., supra, there is no obvious relationship between the chemical structure of monomers and the compatibility of their polymers. The factor of relative polarity is sometimes mentioned, polymers of similar polarity being characteristically more compatible than those of differing polarity. This is one of the factors included in present day theories concerning compatibility.

Starting with the work of Burrell ("Solubility Parameters for Film Formers." *Official Digest of Federation Paint Varnish Production Clubs*, Vol. 27 (1955) p.726), the prevailing modern theories regarding solubility and compatibility are based on one, two, or three "solution parameters". In its most extended frm the theory includes not only the solubility parameter of Burrell, but also the hydrogen bonding parameter and dipole moment introduced by others. The several parameters are regarded as independent of one another, but can be combined as two-or-three-dimensional variations of a single solution parameter. In general it is accepted that solution occurs when the solution parameters of two materials are sufficiently similar to one another, and that phase separation occurs when they are sufficiently different from one another. For example, it is often estimated that organic solvents will be miscible unless their solubility parameters differ by more than three or four units (sometimes termed "hildebrands"), but that to insure compatibility of resins, the difference must be less than 1.

It is characteristic of this theory that the treatment of resin compatibility is more complex than that of solvents. The parameters of resins must be denoted by a range of values rather than a single point. In graphical treatment this leads to characterization by areas or volumes of irregular shape.

While compatibility of resins, therefore, does not lend itself to precise quantitative treatment, the art is sufficiently advanced to be readily understandable to coating technologists. Data relating to solution parameters of polymers of numerous manufacturers is now available, and the practice of providing it is increasingly common. The degree of incompatibility of solutions required for the compositions of the present invention is thus readily attainable with no more than the ordinary skills required in coating technology.

As would be expected according to the theory, I have found that the relative compatibility of two polymer solutions is dependent both on the resins and solvents of each phase. While the total incompatibility of solutions must be provided largely by the resins, it is often preferable that it be provided in part by using different solvents in the two phases. This is wholly satisfactory as long as the solvents are not in themselves immiscible, and neither one is a precipitant for the resin of the other phase.

It is an objective of this embodiment of the present invention to provide immiscible solutions without immiscible solvents. The solvents, however, need not be identical. While the total immiscibility of solutions must be provided largely by the resins (because of their greater effectiveness), it is often preferable that it be provided in part by using different solvents in the two phases.

As a rule, a solvent or solvent mixture which is good for one polymer, will be only a moderately good solvent for another polymer. It is preferable, therefore, to match the solvents with the resins, as in ordinary practice. The essential requirement is that neither solvent shall be a precipitant for the solution of the other phase. That is, the solvent of each phase must be at least a fair solvent for the polymer of the other phase.

As would be expected from the solution theory, I have found that the total immiscibility of two solutions is a compound effect, provided in part by the DI of the resins, and in part by the differential in solution parameters of the solvents, which can be called the solvent differential. If this solvent differential is low, such as 1 hildebrand, it will have little effect on the total immiscibility. If it is on the order of 2 or 3 hildebrands, it can provide a substantial proportion of the required immiscibility of solutions. This is desirable in that it reduces the DI required for the polymers.

One of the most novel and unexpected aspects of this embodiment of the present invention is that each phase can be colored differently, by dispersing pigments in each coating composition in the usual manner prior to mixing the compositions together, and the differently colored phases can then be mixed to form a multi-color coating. Generally there may be some transfer of polymer from one phase to the other, yet the colors remain substantially unchanged. When difficulty is encountered with transfer of pigment, this appears to be related to an insufficient DI of the polymers, or to inadequate wetting of the pigments by their own vehicles before intermixing with the other vehicle.

Another feature of the present invention is that each phase may contain a mixture of polymers rather than a single polymer. Suppose, for example, that resins A and B are substantially compatible with one another, but incompatible with C. If in dispersions of A and C the DI is too high, and in dispersions of B and C it is too low, a mixture of A and B can desirably be used as the polymer to disperse with C. If with two polymers, P and Q, considerable proportions of Q are compatible with P, the DI may also be reduced by mixing a portion of Q with the solution of P, then dispersing the P–Q solution with solution Q.

The essential factors of transient dispersions have been set forth in terms of two immiscible phases. Although this is the typical situation, the same principles apply to the use of three or more immiscible coating compositions to provide a three or more phase coating composition. As the number of phases is increased, it becomes more difficult to provide a common solvent which is a good solvent for all polymers. In present example VI below, the ethyl cellulose required a portion of butyl alcohol in addition to hydrocarbon solvent to maintain a moderate degree of solvation in the presence of the other phases.

The transient dispersions of the present invention afford especially unique effects of great variety, some of which are entirely unobtainable by any stable type of dispersion in which the dispersed globules are kept separate from one another.

In the transient dispersions, both dispersed and dispersing phases are generally colored, though one of them can be used as a clear film-former. The dispersed droplets tend to coalesce with one another during setting of the film, and many of the final droplets are derived from the coalescence of smaller particles. Visible pattern elements may also be formed by aggregation of nearly invisible droplets into non-coalescing clusters. Many of the dispersed particles, for instance, may be too small to be distinguishable in themselves, yet give rise to clearly visible multi-color patterns by the process of partial aggregation or orientation during the setting of the film.

Because of this method of pattern formation, all transient dispersions tend to give multi-color effects different from those of stable dispersions. For example, patterns resulting from spray application often display intricate interwoven effects, some of which simulate the appearance of leather or hammer type finishes. Patterns derived by brushing, doctoring, or other shear type of application are even more unique, since they yield striated effects which can resemble wood grains or marbleized finishes. These striated patterns result from the fluid character of these compositions, which allows both phases to flow, as in ordinary paint compositions, without mixing of the colors with one another.

It is a characteristic of the transient dispersions that while the dispersed droplets normally remain suspended for considerable periods of time, sufficient coalescence can eventually occur to result in a spearate layer. The original state of the separate is readily restored, however, by light stirring. Occasional stirring during application may also be desirable in order to insure uniform behavior.

Another interesting characteristic of the transient dispersions is that they allow either phase to be tinted independently, after forming the dispersion, by stirring with a pigment dispersed in a coating solution of the type which it is desired to tint. This affords obvious advantages in the process of manufacturing, and also in usage by applicators in the field.

While the most striking aspects of the present heterogeneous dispersions are related to multi-color film formation, they are also novel in providing films of attractive appearance and good physical properties which are not normally associated with incompatible film-formers. These desirable and unexpected features apparently arise from the employment of dispersions of macroscopic particle size in which the discontinuous elements are not emulsified, but largely within the range of visual distinction.

METHOD OF PREPARING DISPERSIONS

The dispersions of this invention can be prepared with conventional mixing equipment commonly used in the coating industry. In general the method of preparation involves the compounding of one or more coating vehicles, the addition of one or more of these to a dispersing medium, and moderate agitation to produce a dispersion. Satisfactory dispersions may be obtained with ordinary rotary paddle type agitators. Any other suitable method of agitation might be used, such as shaking, tumbling, etc.

Pigmentation of the film-forming vehicles involves the usual dispersion of fillers, pigments, etc. These are preferably dispersed in the vehicle to be used, in the usual manner, rather than added as pre-dispersed pastes in another vehicle. The conventional pigments and fillers are suitable, but colorants which have appreciable solubility in the solvents of either phase should be avoided as far as possible.

In preparing the stable dispersions of this invention, one step involves treatment of the composition to be dispersed with cross-linking agents as discussed hereinabove. When required, such treatment often follows any conventional compounding, such as incorporation of fillers, pigments, etc. When the composition has been suitably compounded and treated, it is then ready for addition to the dispersing medium.

In the stable type of dispersion, the size of dispersed globules of coating solution, such as paints, lacquers and enamels is an important factor in determining the appearance of the applied coating. The globule size is largely determined by the viscosities of the vehicles, and the type of agitation used in producing the dispersion. Globule size tends to decrease especially with more vigorous agitation, such as produced by larger paddles, increased speed, or increased time of agitation. Other factors affecting globule size are the viscosity and temperature of the dispersed and dispersing phases, and the ratio of their volumes. At constant agitation, globule size tends to increase with greater viscosity of the dispersed phase, with lower viscosity of the dispersing medium, and with lower ratio of dispersed to dispersing phase.

In the unstable type of dispersion, droplet size is variable, and dependent on recent treatment prior to use. In the dispersion as applied, average droplet size is often below the range of distinct visibility. Effective droplet size in the finished coating is dependent largely on the extent of coalescense during setting of the film. The final or apparent droplet size tends to increase especially with lower viscosity and reduced volatility of the dispersing medium.

Particle shape is variable, but typically rounded and smooth in outline. In the transient dispersions, the basic droplets are approximately spherical, but the final pattern may consist of intricate shapes derived from their coalescence with one another during setting of the film.

The viscosity and other properties of these dispersions are influenced by the volume ratio of dispersed phase to dispersing phase. The ratio chosen will depend upon the materials used, and the desired application or pattern. Very high ratios increase the problems of stabilization, and tend to give high viscosities. If there is no film former in the outer or dispersing phase, very low ratios lead toward discontinuous or scattered effects of the dispersed particles. For most applications, a desirable ratio of dispersed phase to dispersing phase will be between 0.5:1 and 4:1, in terms of parts by volume.

Another factor often requiring consideration is the relative specific gravity of dispersed and dispersing phases. In many cases, as in multiple dispersions where a uniform mixture of components is desired, all phases should preferably have approximately equal specific gravities, to prevent non-uniform distribution on usage. In other cases a differential in specific gravity may be preferred as in coating compositions designed to produce a clear overlay. In non-stable dispersions, specific gravity is a significant factor to be considered, as well as viscosities and surface tensions of the several phases.

In preparing dispersions by swelling discrete resinous granules rather than by dispersing one liquid vehicle in another, somewhat different procedures are required for introducing coloring matter into the dispersed granules. In some cases, the solvent-swellable material may be colored before formation of the globules into the size and shape required for the swelling procedure. For example, a thermoplastic material may be pigmented at elevated temperatures and pressures, followed by attrition at lower temperatures into granules of the desired size. Swelling and dispersion of the granules in the desired dispersing medium then completes the composition. For production of striking patterns, most of the dispersed swollen globules will be sufficiently large to be visually distinguishable from one another, and many of them may be considerably larger.

By the use of solvent-soluble dyes instead of pigments, globules of any desired color may be produced from a single clear coating material having a suitable granule size. By this procedure, the coating granules are treated with a dye solution which can penetrate or be absorbed by the granules, without dissolving or appreciably softening them. After this treatment, the colored granules are removed from the dye bath and dried by volatilization. They are then swollen by an appropriate solvent or coating vehicle, and stirred into a suitable dispersing medium, which does not dissolve the globules, nor extract the incorporated coloring matter. The dyes useful in this procedure will be soluble in a solvent which has some affinity for the coating material, but will be substantially insoluble in the solvent of the final dispersing medium.

In preparing multi-color coating compositions of either stable or transient type, both dispersed and dispersing media may be colored, or one may be colored and the other colorless. In the stable type of dispersion, the dispersing medium is often colorless. In the transient dispersion it is generally colored. Coating compositions in which the dispersing medium is a clear coating vehicle provide a means for applying, in a single operation, a colored pattern with clear overlay. For this application it is generally preferable that the specific gravity of the dispersing medium be lower than that of the dispersed phase.

When preparation is complete, the coating compositions may be applied in conventional manner, such as by spraying, brushing, dipping, roller coating, application from pressurized aerosol containers, etc.

In order more clearly to disclose the nature of the present invention, the following examples illustrating the invention are provided. It should be understood, however, that this is done solely by way of example and is intended neither to delineate the scope of the invention nor limit the ambit of the appended claims. Unless otherwise stated all parts of ingredients are expressed in terms of parts by weight.

Examples I through VI below illustrate the transient dispersions, in which the dispersed droplets coalesce with one another, and phase separation is dependent primarily on the degree of incompatibility of the polymers used in the separate phases. Examples VII through XII below illustrate the stable dispersions, in which the dispersed globules remain separate from one another, and phase separation is dependent on the limited swelling of the polymer of the dispersed phase in the solvents of either phase.

EXAMPLE I

Multi-color nitrocellulose — vinyl resin coating composition

Composition A — Yellow nitrocellulose vehicle

| | Parts by weight |
|---|---|
| Nitrocellulose (11.8–12.2% nitrogen, 5–6.5 sec. viscosity, 30% butyl alcohol) | 5.2 |
| Dibutyl phthalate | 3.5 |
| Butyl acetate | 45.2 |
| Toluene | 45.2 |
| Yellow iron oxide | 0.9 |
| Total | 100 |

Composition B — Red vinyl resin vehicle

| | Parts by weight |
|---|---|
| Vinyl chloride - vinyl acetate copolymer, partially saponified (vinyl chloride, 91%; vinyl acetate, 3%; vinyl alcohol, 6%) Bakelite VAGH | 16.5 |
| Dibutyl phthalate | 4.9 |
| Butyl acetate | 38.5 |
| Toluene | 38.5 |
| Red iron oxide | 1.6 |
| Total | 100 |

Composition C — Multi-color yellow-red nitrocellulose - vinyl resin coating

Thirty-eight parts of composition B were added to 62 parts of composition A, and the resulting mixture was stirred with moderate agitation until a dispersion (composition C) of uniform appearance was obtained. Composition C was sprayed as a heavy wet coat onto a tinned steel panel with an ordinary lacquer gun. On setting, the film showed a clearly visible red and yellow multi-color pattern.

EXAMPLE II

Multi-color epoxy — polyurethane coating composition

Composition A — Red epoxy resin vehicle

| | Parts by weight |
|---|---|
| Epichlorohydrin - bisphenol A resin (molecular weight, 900–1000) | 37.5 |
| Toluene | 28.1 |
| Ethylene glycol monoethyl ether acetate | 28.1 |
| Red iron oxide | 6.3 |
| Total | 100 |

Composition B — Yellow polyurethane vehicle

| | Parts by weight |
|---|---|
| Polyurethane resin solution (one package, stable, oxygen-curing type without free isocyanate, 50% solids in xylol) (Spencer Kellogg XP-1197) | 80 |
| Ethylene glycol monoethyl ether acetate | 10 |
| Tinting paste, medium chrome yellow in linseed oil, 70% pigment | 10 |
| Total | 100 |

Composition C — Multi-color red-yellow epoxy - polyurethane coating

Fifty parts of composition A were added to 50 parts of composition B, and the resulting mixture was stirred with moderate agitation until a dispersion (composition C) of uniform appearance was obtained. Composition C was brushed onto a tinned steel panel with an ordinary paint brush. This gave a smooth film in which a multi-colored pattern of striations was readily apparent to the naked eye. Microscopic examination showed that this pattern was formed by the orientation of dispersed droplets or globules which during the setting of the film had aggregated into relatively large clusters without complete coalescence. These clusters were of such size as to be easily distinguished by the naked eye, though many of the individual particles could not be.

This example illustrates the attainability of a glossy multi-color film, and the formation of a distinctly visible pattern through the orientation and clustering of droplets too small in themselves to be readily visible to the naked eye.

EXAMPLE III

Multi-color alkyd resin — styrene butadiene coating composition

| Composition A — Yellow alkyd resin vehicle | Parts by weight |
|---|---|
| Yellow iron oxide | 8.50 |
| Barium potassium chromate | 4.27 |
| Soya - chinawood alkyd (52% oil, 35% phthalic anhydride, 50% solids in mineral spirits) Reichhold's Beckosol P-531 | 35.60 |
| Phenolated alkyd (28% linseed oil, 27% phthalic anhydride, 60% solids in high solvency naphtha, Kauri butanol value, 68) Reichhold's Beckosol 1341 | 30.56 |
| Aromatic petroleum solvent (kauri butanol value, 94; distillation range, 278-332° F.) | 17.00 |
| Dipentene | 2.42 |
| Anti-skinning agent | 0.24 |
| Cobalt naphthenate drier in mineral solvent, cobalt, 6% | 0.37 |
| Lead naphthenate drier in mineral solvent, lead, 24% | 0.74 |
| Manganese naphthenate drier in mineral solvent, manganese, 6% | 0.12 |
| Calcium naphthenate drier in mineral solvent, calcium, 4% | 0 .18 |
| Total | 100 |
| Composition B — Green styrene butadiene vehicle | |
| Chrome green oxide | 10.2 |
| Aluminum silicate | 10.4 |
| Dimethyl dioctadecyl ammonium bentonite | 0.20 |
| Styrene butadiene resin (low viscosity type) (solution viscosity, 33-1/3% resin in xylene, requires 195 to 240 seconds to drain 4 Ford Cup at 77° F.) Pliolite S-5A | 11.70 |
| Styrene butadiene resin (high viscosity type) (85% styrene and 15% butadiene, softening point 49° C.) Pliolite S-6B | 1.70 |
| Chlorinated poly-phenyl resin (Aroclor 5460) | 5.00 |
| Chlorinated biphenyl (Aroclor 1254) | 0.75 |
| Tricresyl phosphate | 1.30 |
| Chinawood oil | 1.00 |
| Mineral spirits | 8.60 |
| Aromatic petroleum solvent (kauri butanol value, 72; distillation range 321-398° F.) | 48.74 |
| Dipentene | 0.30 |
| Acetone | 0.06 |
| Drier, cobalt naphthenate in mineral solvent (6% cobalt content) | 0.02 |
| Drier, manganese naphthenate in mineral solvent (6% manganese content) | 0 .03 |
| Total | 100 |

Composition C — Multi-color yellow-green alkyd - styrene butadiene coating

Equal parts of compositions A and B were intermixed, and stirred until a dispersion of uniform appearance was obtained. Soon after agitation was interrupted, resulting composition C was sprayed and brushed onto tinned steel panels, using an ordinary lacquer gun or paint brush. Brushing gave a striated, multi-colored film in which the individual areas of yellow and green were clearly visible to the unaided eye. Spraying gave a less directional pattern.

EXAMPLE IV

Multi-color alkyd - ethyl cellulose coating composition

| Composition A — Yellow alkyd vehicle | Parts by weight |
|---|---|
| Rosin modified alkyd (34% soya oil, 44% phthalic anhydride, 50% solids in xylol) Reichhold's Beckosol 1303-50 | 50.9 |
| Yellow iron oxide | 2.5 |
| Xylol | 45.7 |
| Cobalt naphthenate drier in mineral solvent, cobalt, 6% | 0.26 |
| Manganese naphthenate drier in mineral solvent, manganese, 6% | 0.26 |
| Lead naphthenate drier in mineral solvent, lead, 24% | 0 .38 |
| Total | 100 |
| Composition B — Red ethyl cellulose vehicle | |
| Ethyl cellulose (49.0+% ethoxy content, 100 cps. viscosity) | 10 |
| Red iron oxide | 1.2 |
| Aromatic petroleum solvent (kauri butanol value, 72; distillation range 321-398° F.) | 88 .8 |
| Total | 100 |

Composition C — Multi-color yellow-red alkyd - ethyl cellulose coating

Sixty-seven parts of composition A were intermixed with 33 parts of composition B, and stirred with moderate agitation until a dispersion of uniform appearance was obtained. Shortly after interruption of agitation, resulting composition C was sprayed and brushed onto tinned steel panels, using an ordinary lacquer gun or paint brush. In either case, a visible multi-color effect appeared upon setting of the film. Brushing produced striations, while spraying gave a non-directional pattern.

EXAMPLE V

Multi-color vinyl, alkyd modified acrylic - polyester coating composition

| Composition A — Red vinyl, alkyd modified acrylic vehicle | Parts by weight |
|---|---|
| Vinyl chloride - vinyl acetate copolymer, partially saponified (vinyl chloride, 91%; vinyl acetate, 3%; vinyl alcohol, 6%) (The degree of saponification is indicated by the proportion of vinyl acetate (3%) to vinyl alcohol (6%), the latter being obtained by the saponification of the former.) (intrinsic viscosity in cyclohexanone at 20° C. is approximately 0.55) Bakelite VAGH | 10.8 |
| Alkyd modified acrylic resin, semioxidizing oil, 50% solids in xylol (Lustrasol 4280, Reichhold) | 36.1 |
| Red iron oxide | 2.4 |
| Isopropyl alcohol | 14.4 |
| Acetone | 36.1 |
| Cobalt naphthenate drier in mineral solvent; cobalt, 6% | 0 |
| Total | 100 |
| Composition B — Yellow polyester vehicle | Parts by weight |
| Linear polyester resin, softening range, 67-71° C. (Vitel PE-200) | 24.4 |
| Yellow iron oxide | 2.4 |
| Toluene | 48.8 |
| Methyl isobutyl ketone | |
| Total | 100 |

Composition C — Multi-color red-yellow vinyl, alkyd modified acrylic - polyester coating Equal parts of compositions A and B were intermixed, and stirred until a dispersion of uniform appearance was obtained. Soon after agitation was interrupted, resulting composition C was brushed onto a tinned steel panel with an ordinary paint brush, yielding a continuous film with clearly visible multi-color grain effect resembling that of wood.

Heating the panel to 250° F. for several minutes considerably increased the film gloss.

In this example a mixture of resins was used in one phase in order to provide the desired degree of incompatibility with the resin of the other phase, thus permitting both adequate phase separation and good film formation.

EXAMPLE VI

Multi-color styrenated alkyd - ethyl cellulose - styrene butadiene coating composition Composition A — Yellow styrenated alkyd dispersing vehicle

| | Parts by weight |
|---|---|
| Styrenated alkyd resin, 45% solids in toluol (Styresol 4240 - Reichhold) | 48.8 |
| Tinting paste, medium chrome yellow in linseed oil, 70% pigment | 2.4 |
| Aromatic petroleum solvent (kauri butanol value, 72; distillation range 321-398° F.) | 48.8 |
| Total | 100 |

Composition B — Red ethyl cellulose vehicle

| | Parts by weight |
|---|---|
| Ethyl cellulose (49.0+% ethoxyl, 100 cps. viscosity) | 7.9 |
| Red iron oxide | 1.6 |
| Aromatic petroleum solvent (kauri butanol value, 72; distillation range 321-398° F.) | 70.8 |
| Butyl alcohol | 19.7 |
| Total | 100 |

Composition C — Black styrene butadiene vehicle

| | |
|---|---|
| Styrene butadiene resin (low viscosity) Pliolite S-5A | 26.3 |
| Lamp black | 2.8 |
| Chlorinated biphenyl (Aroclor 1254) | 2.9 |
| Aromatic petroleum solvent (kauri butanol value, 72; distillation range 321-398° F.) | 68.0 |
| Total | 100 |

Composition D — Multi-color yellow-red-black styrenated alkyd - ethyl cellulose - styrene butadiene coating

| | |
|---|---|
| Composition A | 75 |
| Composition B | 12.5 |
| Composition C | 12.5 |
| Total | 100 |

Compositions B and C were added to composition A in the order listed, with stirring after each addition to disperse the added material, thereby providing composition D.

Composition D was brushed and sprayed onto tinned steel panels, yielding multi-colored films which were striated when brushed, and more regular in pattern when applied by spraying.

In this example, three immiscible vehicles are used instead of two. This permits the extension of the non-stable type of dispersion to a three-color coating composition.

The presence of polymers in three phases rather than two, increases the difficulty of providing a common solvent for all phases. A small solvent differential was necessary here to improve the solubility of the ethyl cellulose.

In addition to the preceding examples, the following table lists some of the more common types of film-forming polymers which are sufficiently incompatible with one another to provide immiscible phases in the transient type of dispersions. The solvents listed are not critical, but are included for illustrative purposes. They are either common to both polymers, or represent solvents commonly used for these materials.

TABLE OF INCOMPATIBLE FILM-FORMERS

| First Phase | Second Phase |
|---|---|
| 1. Raw linseed oil (without volatile solvent) | Melamine-formaldehyde resin in xylol-butanol |
| 2. Raw linseed oil in toluene | Styrenated alkyd in toluene |
| 3. Oxidized linseed oil in toluene | Styrenated alkyd in toluene |
| 4. Oxidized linseed oil in odorless mineral spirits | Dehydrated castor oil in odorless mineral spirits |
| 5. Oxidized linseed oil in odorless mineral spirits | Cyclopentadiene modified linseed oil in odorless mineral spirits |
| 6. Vacuum polymerized linseed oil in toluene | Styrenated alkyd in toluene |
| 7. Vacuum polymerized linseed oil in odorless mineral spirits | Limed linseed-soya alkyd in mineral spirits and odorless mineral spirits |
| 8. Vacuum polymerized linseed oil in mineral spirits | Styrenated soybean oil in mineral spirits |
| 9. Dehydrated castor oil in toluene | Melamine-formaldehyde resin in xylol-butanol |
| 10. Polyurethane (pre-reacted type) in xylol | Chlorinated natural rubber in toluene |
| 11. Cellulose acetate butyrate (29.5% acetyl, 17% butyryl) in 1-nitropropane | Vinyl chloride-vinyl acetate copolymer (vinyl chloride, 87%; vinyl acetate, 13%) in 1-nitropropane |
| 12. Nitrocellulose (11.8-12.2% nitrogen) in butyl acetate | Low viscosity styrene butadiene resin in butyl acetate |
| 13. Acrylic ester resin in toluene | Low viscosity styrene butadiene resin in toluene |
| 14. Acrylic ester resin in solvent mixture of ethylene glycol monoethyl ether acetate and toluene (40:60 ratio) | Linear polyester resin in solvent mixture of ethylene glycol monoethyl ether acetate and toluene (40:60 ratio) |
| 15. Polymethyl methacrylate in solvent mixture of toluene, ethyl alcohol (80:20 ratio) | Ethyl cellulose in solvent mixture of toluene, ethyl alcohol (80:20 ratio) |
| 16. Polymethyl methacrylate in solvent mixture of xylol, butanol (80:20 ratio) | Urea-formaldehyde resin in solvent mixture of xylol, butanol (80:20 ratio) |
| 17. Polymethyl methacrylate in xylol | Modified alkyd (Amberlac 292X, Rohm & Haas) in xylol |

EXAMPLE VII

Multi-color alkyd resin coating composition

Composition A — Green alkyd resin vehicle

| | Parts by weight |
|---|---|
| Resin modified alkyd (42% vegetable oil, 40% solids in odorless mineral spirits) Reichhold OP-849-40 | 71.1 |
| Light chrome green pigment | 2.8 |
| Odorless mineral spirits (kauri butanol value, 27; distillation range, 362-390° F.) | 24.6 |
| These components were compounded, then stirred during the addition of | |
| Tetrabutyl titanate | 1.5 |
| Total | 100 |

With continued stirring, the mixture was heated to 180° F., then cooled and allowed to stand overnight.

Composition B — Yellow alkyd resin vehicle

This was prepared in the same manner as composition A, substituting medium chrome yellow pigment for light chrome green pigment.

Composition C — Green alkyd resin dispersion

To 43 parts of odorless mineral spirits were added 57 parts of composition A, and the resulting mixture stirred with moderate mechanical agitation until the desired average particle size was obtained.

Composition D — Yellow alkyd resin dispersion

This was prepared in the same manner as composition C, using composition B in place of composition A.

Composition E — Multi-color green-yellow alkyd resin coating

Equal parts of compositions C and D were intermixed, and stirred until a uniform dispersion was obtained.

Composition E was sprayed onto cardboard with a standard lacquer gun. The green and yellow globules were easily seen by the naked eye after the coating film had hardened in place.

In this example a conventional alkyd resin paint was cross-linked with tetrabutyl titanate. After this treatment it was characterized by limited swelling in the solvent used originally to dissolve it. By dispersing treated paints of different color in this solvent, a multicolor coating composition was formed in which the dispersed globules remained discrete and separate from one another.

EXAMPLE VIII

Multi-color styrene butadiene coating composition

Composition A — White styrene butadiene dispersing medium

| | Parts by weight |
|---|---|
| Titanium dioxide | 5.1 |
| Aluminum silicate | 5.2 |
| Dimethyl dioctadecyl ammonium bentonite | 0.10 |
| Styrene butadiene resin (low viscosity) Pliolite S-5A | 5.85 |
| Styrene butadiene resin (high viscosity) Pliolite S-6B | 0.85 |
| Chlorinated poly-phenyl resin (Aroclor 5460) | 2.50 |
| Chlorinated biphenyl (Aroclor 1254) | 0.38 |
| Tricresyl phosphate | 0.65 |
| Chinawood oil | 0.50 |
| Mineral spirits (Kauri butanol value, 36; distillation range 320–368° F.) | 24.30 |
| Aromatic petroleum solvent (kauri butanol value, 72; distillation range 321–398° F.) | 54.37 |
| Dipentene | 0.15 |
| Acetone | 0.03 |
| Drier, cobalt naphthenate; 6% cobalt | 0.01 |
| Drier, manganese naphthenate; 6% manganese | 0.01 |
| Total | 100 |

Composition B — Red and blue swollen styrene butadiene granules

Colored granules of high viscosity styrene butadiene resin (about 500 – 2,000 microns in size) were prepared by soaking some of the resin granules in ethyl alcohol solutions of red dye, and soaking other granules in ethyl alcohol solutions of blue dye. The colored granules were then removed from the alcoholic dye solutions and dried. The dried granules were mixed with one another, and appropriate hydrocarbon solvents were added as follows:

| | Parts by weight |
|---|---|
| Red styrene butadiene resin | 3 |
| Blue styrene butadiene resin | 3 |
| Mineral spirits (Kauri butanol value, 36; (boiling range 320–368° F.) | 18 |
| Aromatic petroleum solvent (Kauri butanol value, 72; distillation range 321–398° F.) | 76 |
| Total | 100 |

The colored granules were softened and swollen by this solvent mixture to about five times their original size but remained separate from one another, and retained their own particular colors.

Composition C — Multi-color red-blue-white styrene butadiene coating

Forty-four parts of composition B were added to 56 parts of composition A, and the whole was stirred to give a uniform mixture (composition C). On application by spraying with an ordinary lacquer gun, composition C gave a coating film in which red, white, and blue sections were readily distinguished from one another on viewing with the naked eye.

This example illustrates the production of multi-color coating compositions by swelling dry granules of a polymer which possesses the required immiscibility characteristics. By adjusting the aromatic content of the hydrocarbon solvent, it could be swollen into discrete, non-coalescing globules of substantially any desired consistency.

EXAMPLE IX

Multi-color vinyl resin coating composition

Composition A — Dispersing Medium

| | Parts by weight |
|---|---|
| Methyl isobutyl ketone | 36 |
| Xylene | 64 |
| Total | 100 |

Composition B — White vinyl resin vehicle

| | Parts by weight |
|---|---|
| Vinyl chloride resin, dispersion type (Bakelite QXKV-2) | 4.6 |
| 4-methoxy-4-methyl pentanone-2 | 26.1 |
| Xylene | 50.6 |

The vinyl chloride resin was stirred into the ketone solvent at room temperature, then warmed in a boiling water bath until solution occurred. The xylene was then added in increments with moderate stirring.

| | |
|---|---|
| Vinyl copolymer resin (Bakelite VMCC): solution type (approximate composition - vinyl chloride, 84%; vinyl acetate, 15%; maleic acid, 0.8%) | 4.6 |
| Methyl isobutyl ketone | 4.6 |
| Xylene | 4.6 |

The vinyl copolymer resin was dissolved in conventional manner, and the solution added to the above vehicle.

| | |
|---|---|
| Titanium dioxide | 1.8 |
| Methyl phthalyl ethyl glycollate | 3.1 |
| Total | 100 |

The pigment was dispersed in the plasticizer, then added to the above vehicle with moderate mechanical stirring. The completed vehicle was allowed to cool and age until it set to a soft gel.

Composition C — Blue vinyl resin vehicle

This was prepared in the same manner as composition B, but with substitution of phthalocyanine blue pigment, 0.1 part, for an equal amount of titanium dioxide.

Composition D — White vinyl resin dispersion

Fifty-five parts of composition B was dispersed in 45 parts of composition A, and the mixture was stirred with moderate mechanical agitation until the desired average particle size was obtained.

Composition E — Blue vinyl resin dispersion

This was prepared in the same manner as composition D, but using composition C in place of composition B.

Composition F — Multi-color white-blue vinyl resin coating

Forty parts of composition D was mixed with 60 parts of composition E, and the mixture was stirred until a uniform dispersion was obtained.

Composition F was sprayed onto a tinned steel panel, yielding a multi-color film in which the blue and white particles were easily distinguished by the naked eye.

In this example the gelatinous globules were provided by employing a vinyl chloride dispersion resin manufactured for use in plastisols. In the solvents used, it was not readily soluble at ordinary temperatures, but was dissolved at a slightly elevated temperature. On cooling it formed a gelatinous solution which remained substantially unchanged upon dispersion in the dispersing medium. The consistency of the globules was modified by incorporating also a portion of conventional solution type vinyl chloride copolymer.

EXAMPLE X

Multi-color epoxy lacquer coating composition

Composition A — Red epoxy resin vehicle

| | Parts by weight |
|---|---|
| Epichlorohydrin - bisphenol A resin solution (40% solids in methyl ethyl ketone, Shell Eponol 55-B-40, approximate molecular weight - 200,000) | 55.2 |
| Methyl ethyl ketone | 33.2 |
| Red iron oxide | 3.3 |
| Tetrabutyl titanate solution (freshly prepared, 1.5% in methyl ethyl ketone) | 8.3 |
| Total | 100 |

The epoxy lacquer was pigmented in conventional manner. The tetrabutyl titanate solution was then added, and the mixture aged for several hours.

Composition B — Yellow epoxy resin vehicle

This was prepared in the same manner as composition A, substituting yellow iron oxide for red iron oxide.

Composition C — Red epoxy resin dispersion

| | Parts by weight |
|---|---|
| Lyophilic clay dispersion in methyl ethyl ketone, 3.3% solids (National Lead Bentone 38 - quaternary ammonium montmorillonite) | 54.5 |
| Composition A | 27.3 |
| 10% clay dispersion (Bentone 38) in methyl ethyl ketone | 18.2 |
| Total | 100 |

Composition A was stirred well with the 3.3% clay dispersion. The 10% clay dispersion was then added, and stirring continued until the lacquer was dispersed and broken into particles of the desired average size.

Composition D — Yellow epoxy resin dispersion

This was prepared in the same manner as composition C, but using composition B in place of composition A.

Composition E — Multi-color red-yellow epoxy lacquer coating

Equal parts of compositions C and D were intermixed, and the mixture was stirred until a uniform dispersion was obtained.

Composition E was sprayed onto a tinned steel panel, yielding a multi-color film in which the red and yellow particles were easily distinguished by the naked eye.

In this example, phase separation is attained primarily by use of a very high molecular weight epoxy resin with a ketone solvent for which it has limited tolerance. Phase separation occurs below a concentration of about 28–24% of the polymer in methyl ethyl ketone.

Immiscibility of phases and stability of the dispersed globules is improved by cross-linking the polymer with tetrabutyl titanate. Organic modified montmorillonite clay is used as a stabilizing agent in the dispersing medium.

EXAMPLE XI

Colored vinyl resin coating composition

Composition A — Blue vinyl resin vehicle

| | Parts by weight |
|---|---|
| Vinyl copolymer resin (Bakelite VMCH) (approximate composition - vinyl chloride, 86%; vinyl acetate, 13%; maleic acid, 1%) | 9.4 |
| Toluene | 74.8 |
| Methyl isobutyl ketone | 10.2 |
| Pigment chips, 25% phthalocyanine blue in vinyl chloride resin | 0.9 |
| 4% calcium naphthenate in mineral spirits | 4.7 |
| Total | 100 |

The vinyl copolymer resin and pigment chips were dissolved before stirring in the calcium naphthenate, which served as cross-linking agent. To promote reaction, this mixture was heated to about 150° F. for about one-fourth hour, then cooled and allowed to age overnight. This provided the objective of rendering the solvated film-former immiscible with the dispersing medium in composition C below.

Composition B — Dispersing medium

The vinyl chloride copolymer of composition A was dissolved as a 2% solution in a solvent mixture having the same composition as that of composition A, before addition of cross-linking agent.

Composition C — Blue vinyl resin dispersion in clear vehicle

Seventeen parts of composition A was dispersed in 83 parts of composition B. On aging, the dispersed material swelled to large soft globules, but did not dissolve or lose appreciable coloring matter to the surrounding medium.

This example illustrates a means of producing large, visibly swollen globules, ranging up to about 5,000 microns, for use as a scatter coat of discontinuous color elements, or for intermixing with dispersions of smaller particle size having similar solvent requirements for the dispersing medium. The degree of swelling was determined in part by the concentration of non-crosslinked resin in the dispersing medium, and could be increased by use of higher concentrations.

EXAMPLE XII

Multi-color oxidized linseed oil coating composition

Composition A — White oxidized linseed oil coating

| | Parts by weight |
|---|---|
| Oxidized linseed oil (Spencer Kellogg Diamond K) | 31.4 |
| Mineral Spirits | 23.5 |
| Odorless mineral spirits | 28.7 |
| Drier, 24% Pb | 0.6 |
| Drier, 6% Mn | 0.1 |
| Titanium dioxide | 8.5 |
| Colloidal silica | 0.4 |
| Tetrabutyl titanate, 44% solution in solvent mixture same as that above | |
| Total | 100 |

This composition was prepared by first compounding the colored oil coating in the usual manner, then converting it to a gelatinous solution by cross-linking the oxidized oil with tetrabutyl titanate. A substantially homogeneous composition was obtained by heating the paint to about 180° F., then adding the tetrabutyl titanate solution with good stirring. This treatment provided the required characteristic of immiscibility with the dispersing medium.

Composition B — Red oxidized linseed oil coating

This was the same as composition A, with 50% of the titanium dioxide pigment replaced with red iron oxide pigment.

Composition C — Dispersing medium

This consisted of a 0.5% dispersion of organic modified magnesium montmorillonite clay (Bentone 38, National Lead Co.) in a solvent mixture of mineral spirits, 45%; odorless mineral spirits, 55%. This is the same solvent composition as that used in compositions A and B.

Composition D — White oxidized linseed oil dispersion

Seventy parts of composition A was dispersed in 30 parts of composition C, and the mixture was stirred with moderate mechanical agitation until the desired average particle size was obtained.

Composition E — Red oxidized linseed oil dispersion

This was prepared in the same manner as composition D, using composition B in place of composition A.

Composition F — Multi-color white-red oxidized linseed oil dispersion.

Equal parts of compositions D and E were intermixed, and the mixture was stirred until a uniform dispersion was obtained.

Composition F was sprayed onto cardboard with an ordinary lacquer gun, yielding a multi-color film in which the red and white particles were easily distinguishable by the naked eye at a distance of several yards.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

I claim:

1. A stable multi-color coating composition having at least one dispersed phase of the discrete globules wherein the dispersed globules are permanently dispersed and remain substantially separate without appreciable coalescence with one another and wherein said globules retain adequate flow characteristics upon aging, said composition being suitable for forming a decorative pattern on a substrate of spaced first areas that are individually visible to the naked eye, said first areas being defined by a first organic film former having known predetermined physical coating characteristics, said composition comprising:
   a. a dispersing phase that is a first organic solvent; and
   b. a dispersed phase disposed in said dispersing phase, said dispersed phase in the form of a plurality of globules individually visible to the naked eye and of an appearance different from that of said substrate, said globules of such sizes as to define said first areas when said composition is applied to said substrate, said globules comprising said first film former and a second organic solvent that cooperate to define a substantially homogeneous gel which gel is substantially insoluble in said first organic solvent, said globules being formed by dissolving said first organic film former in said first organic solvent and thereafter transforming the resultant solution into a gel, and said first and second organic solvents being miscible with one another.

2. A coating composition as defined in claim 1 in which said first and second liquid organic solvents have substantially the same solubility parameters.

3. A coating composition as defined in claim 1 in which said first film former is cross-linked.

4. A coating composition as defined in claim 1 wherein a first portion of said particles of said dispersed phase are of a color different from that of a second portion thereof.

5. A coating composition as defined in claim 1 wherein said particles of said dispersed phase are previously solid particles of said first film former that have been solvated by said second organic solvent to said gel.

6. A coating composition as defined in claim 1 wherein said second organic solvent is one in which said first film former is more soluble at an elevated temperature than at room temperature, and said gel comprises a mixture of said organic film former and said second organic solvent.

7. A coating composition as defined in claim 1 wherein said first film former is a cross-linked polymer gel.

8. A coating composition as defined in claim 1 which further includes:
   c. a second organic film former dissolved in said dispersing phase, with said first and second film formers being substantially soluble in both said first and second organic solvents.

9. A coating composition as defined in claim 8 wherein said first and second organic film formers are substantially incompatible.

10. A coating composition as defined in claim 1 wherein said first film former is selected from the group consisting of epoxy resins, polyurethane resins and mixtures thereof.

11. A coating composition as defined in claim 1 wherein said first film former is selected from the group consisting of resins having a molecular weight of 80,000 or more, and cross-linked polymeric materials.

12. A coating composition as defined in claim 1 in which said first and second organic solvents are identical.

13. A coating composition as defined in claim 1 wherein said first film former is capable of cross-linking, and said gel is one that results from dissolving said first film former in said second organic solvent and thereafter cross-linking said film former.

14. A coating composition as defined in claim 1 which further includes:
   c. a second organic film former dissolved in said dispersing phase, with said first and second organic solvents being selected from a group thereof which are miscible with one another and cause no substantial visible precipitation of said first and second film formers.

15. A process for preparing a stable coating composition that may be used to impart a decorative finish to a substrate, which finish includes a plurality of spaced, visibly distinct areas of different appearance, said process including:
  a. preparing a first vehicle by dissolving a first organic film former in a first organic liquid with said first vehicle being divided into at least two portions;
  b. imparting an appearance to one of said portions that is different from the other thereof;
  c. transforming each of said portions to a gel that is not appreciably soluble in said first organic liquid or in a second organic liquid in which said gel is visible to the naked eye in the form of globules which are permanently dispersed and remain substantially separate without appreciable coalescence with one another and wherein said globules retain adequate flow characteristics upon aging; and
  d. mixing said first and second transformed portions with agitation into said second organic liquid that is miscible with said first organic liquid, which agitation subdivides said portions into a plurality of particles of such size that the major portions thereof are visible to the naked eye and provide said spaced areas on said substrate when said composition is applied thereto.

16. A process as defined in claim 15 wherein said appearance is imparted by coloring at least one of said portions to a color different from that of the other of said portions.

17. A process for preparing a stable coating composition that may be used to impart a decorative finish to a substrate, which finish includes a plurality of spaced areas, said process including:
  a. preparing a first colored vehicle by dissolving a first organic film former in a first organic liquid, with either said first film former or first organic liquid being colored;
  b. transforming said first vehicle into a colored gel; and
  c. mixing said first colored gel with agitation into a second organic liquid that is miscible with said first organic liquid but with which second liquid said gel is immiscible, which agitation subdivides said first colored gel into a plurality of particles that are individually visible to the naked eye in the form of globules which are permanently dispersed and remain substantially separate without appreciable coalescence with one another and wherein said globules retain adequate flow characteristics upon aging and that provide said spaced areas on said substrate when said composition is applied thereto.

18. A process as defined in claim 17 which includes the additional step of:
  d. coloring said second organic liquid to a color different from that of said first vehicle.

19. A process as defined in claim 17 wherein said first organic film former comprises an organic polymeric material that may be cross-linked to increase the molecular weight thereof, with said transformation being effected by adding a cross-linking agent to said first organic liquid in which said polymeric material is dissolved.

20. A process as defined in claim 15 which includes the further step of:
  d. adding a stabilizer to said composition to prevent coalescence of said particles during prolonged storage of said composition.

21. A process as defined in claim 17 wherein said first organic liquid is one in which said first organic film former is more soluble at an elevated temperature than at room temperature and in which said transformation is effected by dissolving said film former in said first organic liquid at said elevated temperature and allowing the same to cool to room temperature.

22. A process as defined in claim 17 which includes the further step of:
  d. dissolving a second organic film former in said second organic liquid, with said first and second liquids being selected from a group of organic liquids that are miscible with one another and said first and second film formers are substantially soluble in both said first and second solvents.

23. A stable coating composition that may be used to impart a decorative finish to a substrate, which composition comprises a dispersion and includes:
  a. a dispersing phase comprising a first portion of an organic liquid in which a first organic film former is dissolved; and
  b. a plurality of globules of a dispersed phase that are individually visible to the naked eye, are permanently dispersed and remain substantially separate without appreciable coalescence with one another and wherein said globules retain adequate flow characteristics upon aging and are defined by a homogeneous gel that is not appreciably soluble in said first phase, said globules of the dispersed phase comprising a second portion of said organic liquid, said first film former and a colorant, which colorant is not soluble in said organic liquid, and said globules being formed by dissolving said first film former in the second portion of the organic liquids, incorporating said colorant and thereafter transforming the solution into a gel, and with said decorative finish on said substrate being a plurality of spaced areas defined at least in part by said particles.

24. A coating composition as defined in claim 23 wherein said organic film former is of a type that may be cross-linked, and said dispersed phase is a second portion of said organic film former, organic liquid, and colorant that has been transformed by cross-linking into said gel.

25. A process for preparing a stable coating composition that may be used to impart a decorative finish to a substrate, which finish includes a plurality of spaced, visibly distinct areas, said process including:
  a. preparing a plurality of first vari-colored vehicles by dissolving a plurality of first organic film formers and different colorants in a plurality of separate first organic liquids;
  b. transforming said plurality of said first vehicles into a plurality of gels in the form of globules which are permanently dispersed and remain substantially separate without appreciable coalescence with one another and wherein said globules retain adequate flow characteristics upon aging; and
  c. mixing said first colored vehicles by agitation with a second organic liquid which second organic liquid is selected from a group thereof that is miscible with said first organic liquid but with which said gels are substantially immiscible, which agitation subdivides said gels into a plurality of particles of different colors that are individually visible to the naked eye and that provide said spaced areas on said substrate when said composition is applied thereto.

* * * * *